July 2, 1935.  W. McCAUSLAND ET AL  2,006,715
GATE VALVE
Filed July 29, 1930
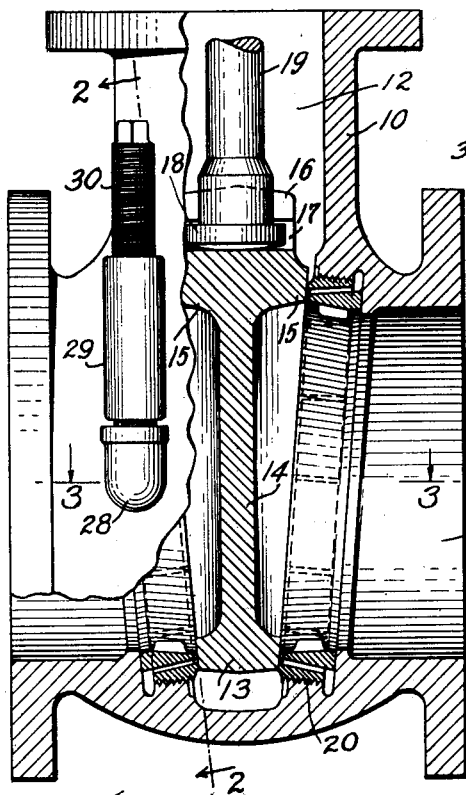
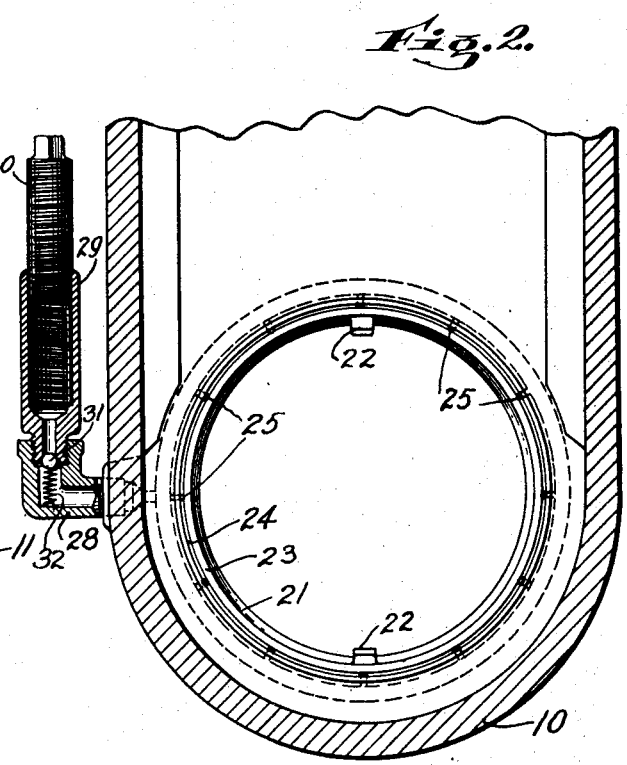
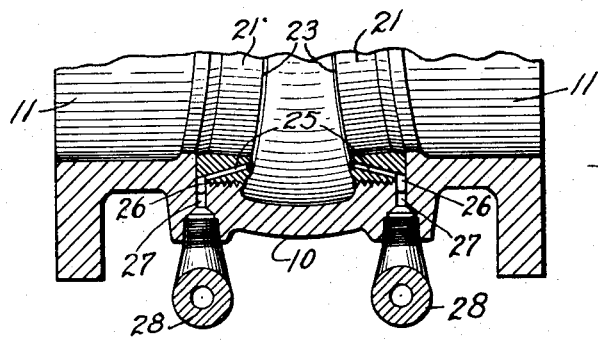
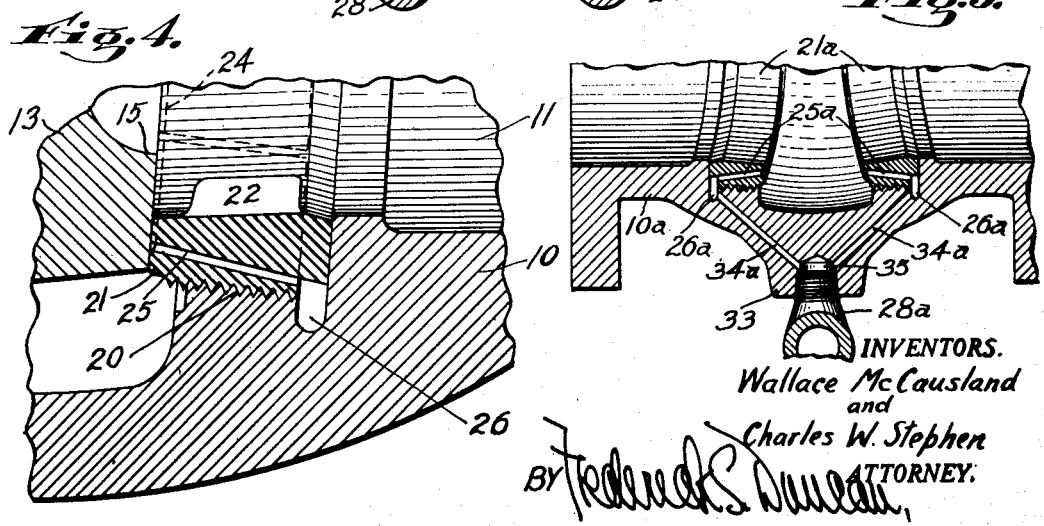
INVENTORS.
Wallace McCausland
and
Charles W. Stephen
BY Frederick S. Duncan
ATTORNEY.

Patented July 2, 1935

2,006,715

UNITED STATES PATENT OFFICE 2,006,715

GATE VALVE

Wallace McCausland and Charles W. Stephen, Bridgeport, Conn., assignors to Reading-Pratt & Cady Company, Inc., a corporation of New York Application July 29, 1930, Serial No. 471,449

3 Claims. (Cl. 251—167)

Our invention relates to gate valves and has for an object to provide means for overcoming locking or binding of the gate in the seat so that the valve may be operated more easily.

Another object of the invention is to provide a more effective seal between the gate and its seat.

Another object of the invention is to reduce wear on the bearing surfaces.

The invention is particularly useful in wedge type valves of the larger sizes. In such valves the gate is usually forced into its closed position under heavy pressure and this in conjunction with the tapered bearing surfaces sets up a substantially dragging or abrasive effect which locks or binds the wedge or gate in the valve seats. Such valves are frequently closed when hot and during cooling of the valves unequal expansions take place, sometimes increasing the binding effect. It is, therefore, an object of our invention to provide means for applying a lubricant between the gate and its seat or seats and exerting pressure upon the lubricant to overcome the binding effect.

Another object of the invention is to employ a lubricant which will not only serve to lubricate the valve but will fill up uneven surfaces or minute roughnesses in the engaging faces, and thus serve as a packing. A further advantage of applying lubricant to the valve is the fact that it eliminates galling of the seating surfaces in valves used for both high pressure and high temperature.

It is common practice in gate valves to use a ring screwed into the valve body and against which the gate seats. One of the difficulties resulting from such an arrangement is that leakage is apt to occur through the joint between the seat ring and the valve body. It is an object of our invention to provide an annular pocket for lubricant at the base of the seat ring which serves to pack the joint between the seat ring and the valve body and prevent leakage therethrough. An advantage of this construction also lies in the fact that the lubricant serves to prevent corrosion between the seat ring and the body and makes it easier to remove the seat ring for replacement whenever desired.

Other objects and advantages of our invention will appear in the following description of a preferred embodiment and thereafter the novelty and scope of the invention will be pointed out in the claims.

In the accompanying drawing:

Figure 1 is a view partly in side elevation and partly in section, of a wedge type gate valve embodying our invention;

Fig. 2 is a view in vertical section taken substantially on the line 2—2 of Fig. 1;

Fig. 3 is a fragmental sectional view taken on the line 3—3 of Fig. 1;

Fig. 4 is an enlargement of a portion of Fig. 1; and

Fig. 5 is a fragmental view similar to Fig. 3 but showing a modified form of our invention.

The valve shown in the drawing comprises a main body or casing 10 formed with a transverse fluid passage 11 running therethrough. The casing is also formed with a central chamber 12 which intercepts the passage 11 and in which a valve gate 13 operates. This gate is formed with a central web 14 and a pair of oppositely disposed annular flanges 15 which are faced to provide bearing surfaces. These bearing faces are spaced farther apart at the top of the valve than at the bottom to give the gate a wedge shape. The gate is provided at its upper end with a pair of spaced lugs 16 which are formed with undercut grooves 17 adapted to receive the shouldered head 18 of a valve stem 19 by which the gate is raised and lowered.

Formed in the casing 10 at oppoiste sides of the chamber 12 and surrounding the passage 11 are a pair of recesses 20 in each of which a seat ring 21 is screwed. Each ring is formed with inwardly projecting lugs 22 to provide a bearing for a wrench or key with which the ring is tightly screwed into the recess. Each seat ring is provided with a bearing face 23 at the outer side and against these faces the flanges 15 of the gate are seated when the valve is in closed position. Each seat ring is provided in its bearing face 23 with an annular groove 24 which is connected by a plurality of transverse ducts 25 with an annular channel 26 formed between the casing 10 and the rear edge of the ring. Each channel 26 communicates at one side with a passage 27 leading out laterally from the valve casing. An elbow fitting 28 is screwed into each passage and connects with a tubular fitting 29 which serves as a reservoir for a lubricant. The fitting 29 is internally threaded to receive a screw plug 30. By turning the plug 30 lubricant in the reservoir may be forced through the elbow 28, passage 27, channel 26 and ducts 25 into the annular groove 24.

The operation of the valve will now be readily understood. When the gate is in closed position, as shown in Fig. 1, and it is desired to open the valve, if the gate sticks, it is merely necessary to turn the screw plug 30 and thereby force lubricant into the groove 24 between the seat ring and the gate. This may be done on either or both sides of the gate 14. The result will be that the lubricant will spread between the contacting surfaces, breaking the adhesion between said surfaces and permitting easy operation of the valve. Usually the coacting surfaces of the gate and its seats are in fairly close contact throughout, being separated from each other by a fraction of a thousandth of an inch. Thus, even though the lubricant used is quite fluid, it will, nevertheless, serve not only to break the adhesion between the contacting parts but also to pack the joint between the gate and the seat rings, when the valve is closed, providing a perfect seal against leakage. However, we find it preferable in most cases to use a fairly stiff grease for the lubricant or a soap compound which will have a tendency to remain in the low spots of the cooperating faces, after the valve has been opened, thus insuring a tight seal of the valve when closed. The nature of the lubricant used may be varied considerably without departing from the spirit and scope of our invention. Preferably, it is of a waxy nature, although as explained above, under certain circumstances a much more fluid material can be used to advantage.

It will be observed that lubricant in the channel 26 formed at the base of the seat ring 21 serves to pack the joint between the ring and the valve body so that leakage cannot occur through this joint when the valve is closed.

When the valve is used for high pressure fluids there will be considerable back pressure in the reservoirs 29. The screw plugs 30 may not fit so tightly into the reservoir 29 as to prevent the lubricant from being forced out between the screw threads of the plugs and reservoirs. For this reason, we find it desirable to use a check valve in the lower end of each reservoir. As shown in the drawing, this consists of a ball 31 which seats against the lower end of the reservoir and is held to its seat by a spring 32. The ball valve will yield when the plug 30 is screwed into the reservoir, permitting lubricant to be forced into the gate valve, but will resist pressure tending to force the lubricant back and out of the reservoir.

The construction shown in Fig. 5, is similar to that already described except that instead of using two reservoirs, one for each seat ring, we employ a single reservoir with ducts leading to the seat rings. As shown in the drawing, the valve body 10a is provided with a boss 33 at one side into which is screwed the elbow fitting 28a. The latter carries a reservoir, not shown, which reservoir is of the same character as those shown in Figs. 1 and 2. The seat rings 21a are similar to the seat rings 21 and a channel 26a is formed about the base of each seat ring. Ducts 34a lead from said channels to a common passage 35 with which the elbow 28a communicates. It will be understood that with this construction, lubricant forced into the elbow 28a will find its way into both of the channels 26a and thence through openings 25a to the grooves formed in the seating faces of the seat rings.

While we have described a valve using a gate of the solid wedge type, it will be evident that our invention could also be applied to a valve employing a split wedge in which means are provided for spreading the wedges apart against the seats after the valve has been moved to closed position. It will also be understood that our invention can be employed with gate valves in which the sides of the gate are parallel instead of being relatively inclined to form a wedge or in which one side of the valve is inclined and the other parallel with the direction of movement of the gate, thus forming a single instead of a double wedge surface. It will be understood, therefore, that the particular embodiment shown in the drawing is to be taken as illustrative and not as limitative of our invention and that we reserve the right to make such changes in form, construction and arrangement of parts as fall within the spirit and scope of the following claims.

We claim:

1. A gate valve comprising a casing formed with a fluid passage therethrough, a gate slidable transversely to said passage to open and close the same, a seat ring secured in the casing surrounding said passage, the ring and casing being formed to provide a channel therebetween, said seat and the gate being formed with coacting bearing surfaces, the bearing surface of the ring being formed with an annular groove, said ring having ducts connecting said channel and said groove, a reservoir for lubricant communicating with said channel, and means for forcing lubricant from the reservoir into said channel and thence through the ducts to the groove.

2. A gate valve comprising a casing formed with a fluid passage therethrough, a chamber intercepting said passage, a pair of spaced seat rings in the chamber surrounding the passage and screwed into the casing, a gate movable in said chamber and adapted to seat against said rings, the base of each ring and the casing being formed to provide an annular channel therebetween, each ring being also formed with ducts leading from said channel to the bearing surface of the ring, and means for forcing lubricant into the channel to pack the joint between the ring and the casing and to lubricate the bearing surface of the ring through said ducts.

3. A gate valve comprising a casing formed with a fluid passage therethrough, a gate slidable transversely to said passage to open and close the same, a seat ring secured in the casing, the ring and casing being formed to provide a channel therebetween at the base of the ring, said seat and the gate being formed with coacting bearing surfaces, the bearing surface of the ring being formed with a groove, said ring having ducts connecting said channel and said groove, a reservoir for lubricant communicating with said channel, and means for forcing lubricant from the reservoir into said channel and thence through the ducts to the groove.

WALLACE McCAUSLAND.
CHARLES W. STEPHEN.